(12) United States Patent
Birk (10) Patent No.: US 6,967,764 B2
(45) Date of Patent: Nov. 22, 2005

(54) OPTICAL ARRANGEMENT AND SCAN MICROSCOPE

(75) Inventor: Holger Birk, Meckesheim (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 0 days.

(21) Appl. No.: 10/485,426

(22) PCT Filed: Jul. 26, 2002

(86) PCT No.: PCT/EP02/08380
§ 371 (c)(1),
(2), (4) Date: Jan. 30, 2004

(87) PCT Pub. No.: WO03/012516
PCT Pub. Date: Feb. 13, 2003

(65) Prior Publication Data
US 2004/0174585 A1    Sep. 9, 2004

(30) Foreign Application Priority Data
Jul. 30, 2001 (DE) ............... 101 37 155

(51) Int. Cl.[7] .................................. G02F 1/33
(52) U.S. Cl. ................ 359/305; 359/285; 359/368
(58) Field of Search ........................... 359/237, 368, 359/305–14, 370, 372, 285–7, 385, 389, 359/308; 347/239, 135, 255; 348/754, 769; 372/13; 324/76.37; 385/7; 73/79

(56) References Cited

U.S. PATENT DOCUMENTS

| | | | |
|---|---|---|---|
| 4,332,441 A | 6/1982 | Margolis | 359/310 |
| 4,541,694 A | 9/1985 | Sullivan et al. | 359/305 |
| 5,485,272 A * | 1/1996 | Dirksen et al. | 356/484 |
| 6,157,660 A | 12/2000 | Hill | 372/27 |
| 6,510,001 B1 * | 1/2003 | Engelhardt et al. | 359/385 |
| 6,512,588 B1 * | 1/2003 | Hill | 356/510 |
| 6,525,812 B1 | 2/2003 | Hartmann et al. | 356/318 |

FOREIGN PATENT DOCUMENTS

| | | |
|---|---|---|
| DE | 19906757 | 12/1999 |
| DE | 19859314 | 6/2000 |
| DE | 19944355 | 3/2001 |
| EP | 0422956 | 4/1991 |
| WO | WO 97/30331 | 8/1997 |

OTHER PUBLICATIONS

English Translation of JP 05-034649, Patent 3,073,556, Published Jun. 2, 2000, Kadowaki Shinchiro.*

* cited by examiner

Primary Examiner—Jordan M. Schwartz
Assistant Examiner—Jessica Stultz
(74) Attorney, Agent, or Firm—Davidson, Davidson & Kappel, LLC (57) ABSTRACT

An optical arrangement for spatially separating an illumination light beam and a detection light beam includes an acousto-optical component that splits the detection light beam by birefringence. A compensation element is provided that compensates, in a single passage of the detection light beam, for the splitting of the detection light beam.

20 Claims, 5 Drawing Sheets

OPTICAL ARRANGEMENT AND SCAN MICROSCOPE

The invention relates to an optical arrangement for spatially separating an illumination light beam and a detection light beam, with an acousto-optical component.

Furthermore, the invention relates to a scanning microscope having a light source that generates an illumination light beam and having a detector that picks up a detection light beam coming from a specimen, and also having an acousto-optical component for spatially separating the illumination light beam and the detection light beam.

BACKGROUND

In scanning microscopy, a specimen is illuminated with a light beam in order to observe the detection light emitted by the specimen as reflection or fluorescent light. The focus of an illumination light beam is moved in a specimen plane by means of a controllable beam deflector, normally by tilting two mirrors, whereby the deflection axes are usually at right angles with respect to each other so that one mirror deflects in the x direction while the other deflects in the y direction. The mirrors are tilted, for example, by means of galvanometer positioning elements. The output of the detection light coming from the object is measured as a function of the position of the scanning beam. Normally, the positioning elements are fitted with sensors in order to ascertain the actual position of the mirror. The illuminating light is coupled in by means of a beam splitter. The fluorescent or reflection light coming from the object passes through the beam splitter and subsequently reaches the detectors.

Especially in the case of confocal scanning microscopy, an object is scanned in three dimensions with the focus of a light beam.

A confocal scanning microscope normally comprises a light source, a focusing lens system with which the light from the source is focused onto a pinhole diaphragm—the so-called excitation diaphragm—a beam splitter, a deflector for controlling the beam, a microscope lens system, a detection diaphragm and the detectors to pick up the detection or fluorescent light. The illuminating light is coupled in by means of a beam splitter. The fluorescent or reflection light coming from the object returns via the deflector to the beam splitter, passes through the latter and is subsequently focused on the detection diaphragm behind which the detectors are located. This detector arrangement is called a descanning arrangement. Any detection light that does not come directly from the region of focus takes a different light path and does not pass through the detection diaphragm, so that point information is obtained, which produces a three-dimensional image as a result of sequential scanning of the object with the focus of the illumination light beam. In most cases, a three-dimensional image is obtained by means of image data acquisition one layer at a time.

Leica's German Preliminary Published Application DE 199 06 757 A1 discloses an optical arrangement in the optical path of a light source suitable for fluorescence excitation, preferably in the optical path of a confocal laser scanning microscope, having at least one spectrally selective element for coupling the excitation light of at least one light source into the microscope and for blocking out the excitation light that is scattered and reflected off the object, or else the excitation wavelength coming from the object via the detection optical path. For purposes of attaining a variable configuration with a simple design, the arrangement is characterized in that excitation light having different wavelengths can be blocked out by the spectrally selective element. As an alternative, such an optical arrangement is characterized in that the spectrally selective element can be adjusted with respect to the excitation wavelength that is to be blocked out. Moreover, the cited publication states that the spectrally selective element can be configured as an AOTF (acousto-optical tunable filter) or as an AOD (acousto-optical deflector). The above-mentioned preliminary published application states that the spectrally selective element can cause a spatially spectral spreading out which can be compensated for, for instance, with three additional optical components.

German Preliminary Published Application DE 198 59 314 A1 discloses an arrangement of a light-diffraction element for separating excitation and emission light in the optical path of a microscope, preferably in a confocal microscope, and especially in a laser scanning microscope, whereby the light-diffraction element is traversed by the excitation light as well as by the emission light and influences at least one wavelength of the excitation by means of diffraction, whereas other wavelengths emitted by the specimen pass through the element without being affected, as a result of which they are spatially separated from the excitation light. This arrangement comprises an AOTF.

German Preliminary Published Application DE 199 44 355 A1 discloses an optical arrangement in the optical path of a laser scanning microscope with at least one spectrally selective element that can be adjusted to the wavelength of the excitation light of a light source, whereby said element couples excitation light of the light source into the microscope, blocks the excitation light that is scattered and reflected off an object out of the detection optical path and does not block out the detection light coming from the object. In order to simplify the design of the known arrangement as well as to expand the detection variants that are possible so far, this optical arrangement is characterized in that, downstream from the element, there is another optical component and, after it has been traversed, the dispersive and/or birefringent properties of the detection light are combined in such a way that they can be detected and, in a preferred embodiment, this is done coaxially.

In comparison to scanning microscopes where the illuminating light and the detection light are separated by means of a beam splitter, the scanning microscopes mentioned above entail the advantage of spectral flexibility since the acousto-optical component can be adjusted to any desired optical wavelength for the illumination or detection light by means of actuation with sound waves of different frequencies. In addition, the spectral separation of these microscopes is many times better than that of scanning microscopes with beam splitters.

A drawback of optical arrangements having an acousto-optical component for separating the illuminating light and the detection light as well as of scanning microscopes having an acousto-optical component for separating the illuminating light and the detection light lies in the fact that the acousto-optical component is birefringent, which leads to a detrimental splitting of the detection light beam. Moreover, the acousto-optical component usually has a prism effect, which causes a spectral splitting of the detection light beam. The known arrangements do not compensate for this effect adequately and they entail high losses of detection light output. Especially arrangements that call for three additional optical components for the compensation are expensive and their adjustment is complex.

SUMMARY OF THE INVENTION

Therefore, an object of the invention is to provide an optical arrangement that allows a separation of an illumination light beam and of a detection light beam in a way that incurs few losses and largely without causing detrimental splitting phenomena.

The present invention provides a optical arrangement for spatially separating an illumination light beam and a detection light beam. The optical arrangement includes an acousto-optical component capable of splitting the detection light beam by birefringence. A compensation element is also provided. The compensation element is configured to compensate, in a single passage of the detection light beam, for the splitting of the detection light beam. It is likewise an object of the invention to provide a scanning microscope with which detrimental splitting phenomena can be largely compensated for while entailing few losses.

The present invention also provides a scanning microscope. The scanning microscope includes a light source, a detector, an acousto-optical component, and a compensation element. The light source is configured to generate an illumination light beam. The detector is configured to detect a detection light beam coming from a specimen. The acousto-optical component is configured to spatially separate the illumination light beam and the detection light beam, the acousto-optical component being capable of splitting the detection light beam by birefringence. The compensation element is configured to compensate, in a single passage of the detection light beam, for the splitting of the detection light beam.

The invention has the advantage that it can utilize the universality and flexibility of acousto-optical components for separating an illumination light beam and a detection light beam largely without any restrictions.

In a preferred embodiment of the scanning microscope or of the optical arrangement, the acousto-optical component is configured as an AOTF (acousto-optical tunable filter). Likewise feasible embodiments are those with an AOD (acousto-optical deflector) or an AOM (acousto-optical modulator). The acousto-optical element is traversed by a sound wave which, as a function of its frequency, only interacts with one wavelength. Light having other wavelengths remains unaffected by the sound wave. The sound wave is preferably created by an electrically actuated piezo sound generator that is actuated by a high-frequency wave. The value of the high frequency is selected in such a way that only the fractions of the desired wavelength of the illumination light beam reach the specimen. The other fractions of the illumination light beam that are not affected by the acoustic excitation are diverted into a beam trap. The output of the beam coupled out of the illumination light beam can be selected by varying the amplitude of the sound wave. If the detection light beam contains florescent light—which is by nature shifted in the wavelength with respect to the illumination light beam—then the detection light beam passes through the acousto-optical component without being affected by the sound wave.

In a preferred embodiment, the compensation element at least largely compensates for a splitting of the detection light beam caused by dispersion brought about by the acousto-optical component. In a particularly simple version, the boundary surfaces of the compensation element are arranged in such a way that the spectrally split detection light beam that diverges in a fan-shaped manner runs at least parallel after having passed through the compensation element. The distance between the acousto-optical component and the compensation element in this version is selected so as to be as small as possible in order to avoid excessive spatial splitting of the detection light beam between the acousto-optical component and the compensation element. Spatial splitting phenomena in the order of magnitude of half the diameter of the beam are acceptable.

In a preferred embodiment, the compensation element and the acousto-optical component have the same exterior shape. The compensation element and the acousto-optical component are oriented so as to be turned by 180° with respect to each other in terms of the direction of propagation of the detection light beam that strikes the acousto-optical component. The compensation element thus oriented is typically laterally offset with respect to the axis defined by the direction of propagation of the detection light beam that strikes the acousto-optical component, so that the detection light beam strikes the compensation element. Preferably, the compensation element is made of the same material as the acousto-optical component and it has the same crystal structure. The splitting of the detection light beam into partial beams having different polarization caused by the birefringent properties of the acousto-optical component is eliminated.

In a preferred embodiment, the acousto-optical component is not actuated only with the first high frequency corresponding to the desired wavelength of the illumination light beam since said acousto-optical component only completely blocks out the fractions of the wavelength of the illumination light beam having one polarization direction. The fractions having the other polarization direction are almost completely blocked out by actuating the acousto-optical component with another high frequency that differs from the first high frequency.

In another embodiment, the compensation element is another acousto-optical component. It is particularly advantageous to also actuate the compensation unit with a high frequency in order to block out fractions having the wavelength of the illumination light beam that have remained in the detection light beam.

In another embodiment, a provision is made for a temperature stabilization of the acousto-optical component or of the compensation element. In another embodiment variant, in order to avoid the drawbacks caused by temperature fluctuations or fluctuations in the wavelength of the illumination light beam, the high frequency should be controlled or regulated as a function of the temperature. In realizing this objective, another variant provides for the wavelength of the illumination light beam to be controlled or regulated as a function of the temperature.

In a preferred embodiment, a device to effectuate a displacement of the beam is arranged downstream from the acousto-optical component and from the compensation element. As a result, the axis of the detection light beam entering the optical arrangement is coaxial or at least parallel to the axis of the detection light beam leaving the optical arrangement. This simplifies the adjustability of the optical arrangement or of the scanning microscope; furthermore, the arrangement in a scanning microscope can be more easily replaced by a conventional beam splitter in this configuration.

In a preferred embodiment, the acousto-optical component is cemented to the compensation element. In another embodiment, an intermediate element is provided that is cemented to the acousto-optical component and to the compensation element. The cemented embodiments entail the advantage that it is possible to largely avoid losses of detection light output caused by reflections on the boundary surfaces of the acousto-optical component and of the compensation element that face each other. Preferably, there is an entrance window for an illumination light beam on the intermediate element.

BRIEF DESCRIPTION OF THE DRAWINGS

The subject matter of the invention is depicted schematically in the figures, whereby elements having the same function are provided with the same reference numerals. The following is shown.

DETAILED DESCRIPTION

Figure 1:
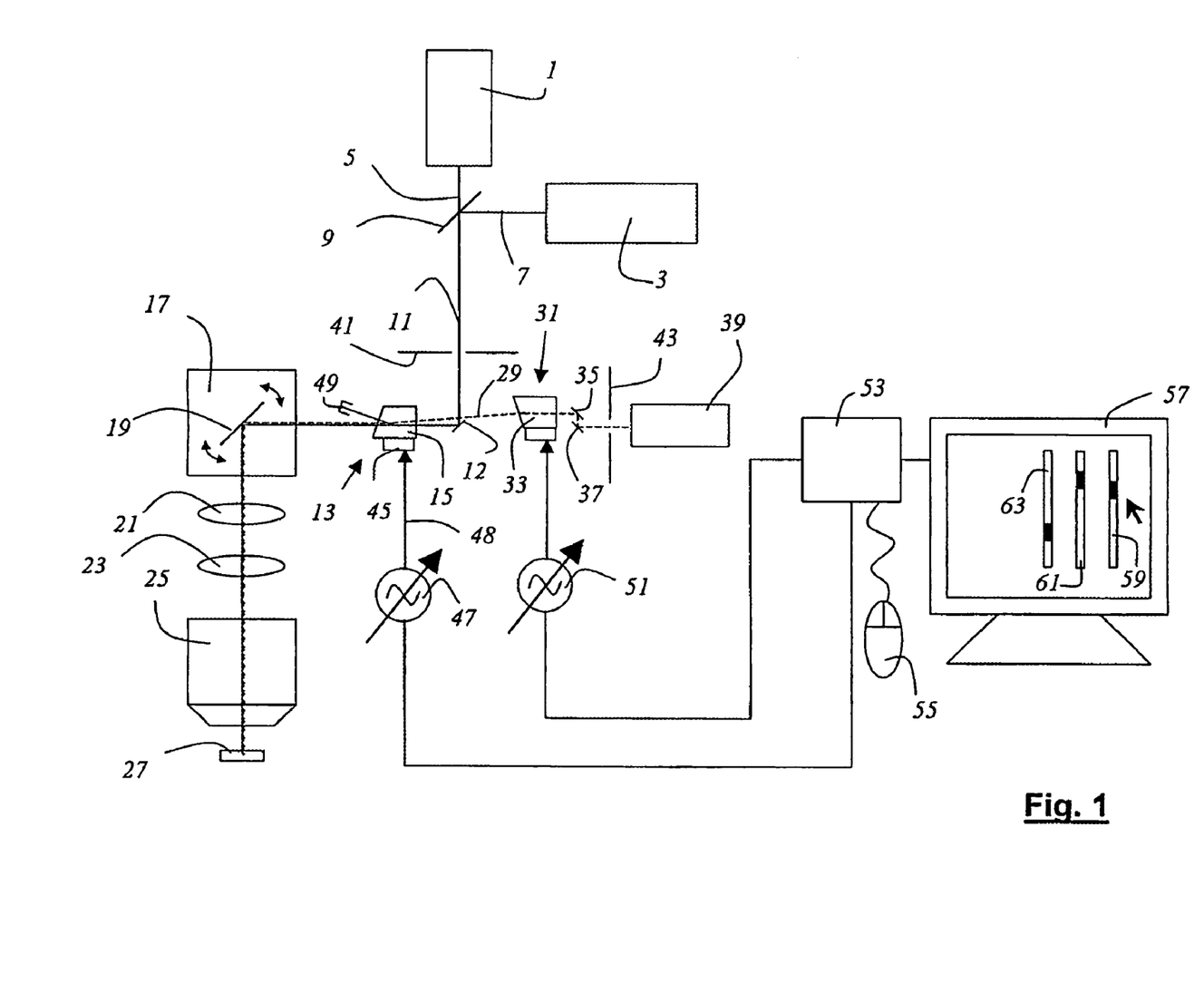
FIG. 1 a scanning microscope.

FIG. 1 shows a scanning microscope according to the invention, which is configured as a confocal microscope, having two lasers 1, 3 whose emission light beams 5, 7, which have different wavelengths, are combined with the dichroitic beam recombiner 9 so as to form one illumination light beam 11. The scanning microscope has an acousto-optical component 13 that is configured as an AOTF 15. The illumination light beam 11 is reflected by a reflecting mirror 12 towards the acousto-optical component 13. From the acousto-optical component 13, the illumination light beam 11 reaches a beam deflection means 17 that contains a gimbal-mounted scanning mirror 19 and guides the illumination light beam 11 through the scanning lens system 21, through the tubular lens system 23 and through the objective lens 25 over or through the specimen 27. The detection light beam 29 coming from the specimen passes in the reverse direction through the scanning lens system 21, through the tubular lens system 23 and through the objective lens 25, thus going via the scanning mirror 19 and reaching the acousto-optical component 13 which guides the detection light beam 29 to a compensation element 31 that is configured as an additional acousto-optical component 33. After passing through the compensation element 31, the detection light beam 29 strikes a pair of mirrors consisting of a first mirror 35 and a second mirror 37. This pair of mirrors serves to bring the detection light beam 29 to the desired beam axis, namely, the beam axis that is defined by the detection light beam 29 as it exits from the beam deflection means 17. The pair of mirrors guides the detection light beam 29 to the detector 39, which is configured as a multi-band detector. In the drawing, the illumination light beam 11 is depicted as a solid line and the detection light beam 29 as a broken line. For the sake of completeness, the illumination pinhole 41 commonly found in a confocal scanning microscope as well as the detection pinhole 43 have also been drawn in schematically. On the other hand, for the sake of clarity, a few optical elements that serve to guide and shape the light beams have been omitted. These elements are sufficiently familiar to the person skilled in the art. The acousto-optical component 13, which serves to select the fractions of the illumination light beam of the chosen wavelengths, is configured as an AOTF 15, which is traversed by a sound wave. This sound wave is generated by an electrically actuated piezo sound generator 45. The actuation is done by means of a high-frequency source 47 that generates an electromagnetic high-frequency wave having several adjustable HF frequencies. The electromagnetic high-frequency wave is transmitted via a coaxial cable 48. The HF frequencies are chosen in such a way that only the fractions of the desired wavelengths of the illumination light beam 11 reach the beam deflection means 17. The other fractions of the illumination light beam 11 that are not affected by the acoustic excitation are diverted into a beam trap. The output of the light having the desired wavelengths of the illumination light beam 11 can be selected by varying the amplitude of the acoustic wave. In this context, the crystal section and the orientation of the acousto-optical component 13 are selected in such a way that, with the same coupling-in direction, different wavelengths are deflected in the same direction. The other acousto-optical component 33 is likewise configured as an AOTF and it is actuated by another high-frequency source 51 having another electromagnetic high-frequency wave. The high-frequency of the other electromagnetic high-frequency wave is selected in such a way that the fractions of the detection light beam 29 that have the wavelength of the illumination light beam 11 are blocked out. A computer 53 is provided for purposes of selecting the HF frequencies. In accordance with the user instructions, this computer 53 controls the high-frequency source 47 and the other high-frequency source 51. With the computer mouse 55, the user establishes the appropriate settings. A slider 59, 61, 63 that serves to set the amplitude is shown on the monitor 57 for each selected HF frequency.

Figure 2:
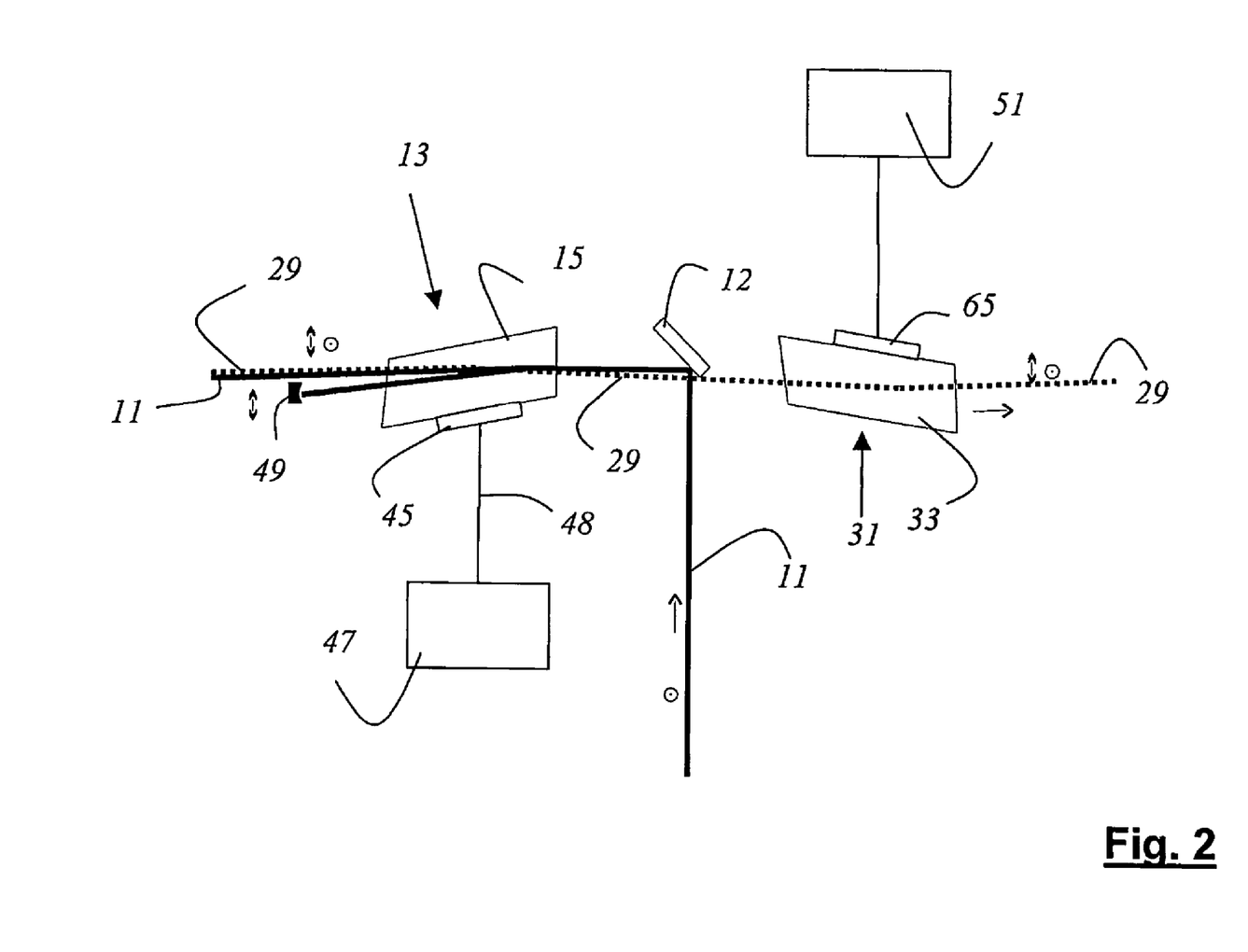
FIG. 2 an optical arrangement.

FIG. 2 shows an optical arrangement according to the invention. The linearly polarized illumination light beam 11, which has a sagittal direction of polarization, is reflected by a reflecting mirror 12 towards an acousto-optical component 13 that is configured as an AOTF 15. This acousto-optical component 13, which serves to select the fractions of the illumination light beam of the chosen wavelengths, is configured as an AOTF 15 that is traversed by an acoustic wave. The acoustic wave is generated by an electrically actuated piezo sound generator 45. The actuation is done by means of a high-frequency source 47 that generates an electromagnetic high-frequency wave having several adjustable HF frequencies. The electromagnetic high-frequency wave is transmitted via a coaxial cable 48. The illumination light beam 11 exits the acousto-optical component 13 at a direction of polarization turned by 90°, in other words, at a tangential direction of polarization. A detection light beam 29 enters the acousto-optical component coaxially to the exiting illumination light beam 11. The detection light beam contains fractions with a sagittal as well as a tangential direction of polarization. The detection light beam passes through the AOTF 15, a process in which fractions having the wavelength of the illumination light beam are largely blocked out. This blocking out, however, is only complete for the fractions having a tangential direction of polarization. After passing through the AOTF 15, the detection light beam 29 strikes a compensation element 31 that is configured as another acousto-optical component 33. This other acousto-optical component 33 is likewise configured as an AOTF and is actuated by another high-frequency source 51 having another electromagnetic high-frequency wave. The HF frequency of the other electromagnetic high-frequency wave is selected in such a way that the fractions of the detection light beam 29 having the wavelength of the illumination light beam 11 and a sagittal direction of polarization are blocked out. The sound wave is generated in the compensation element 31 likewise with an electrically actuated piezo sound generator 65. The compensation element 31 and the acousto-optical component 13 have the same exterior shape and the same crystal structure. The compensation element 31 and the acousto-optical component 13 are oriented so as to be turned by 180° with respect to each other relative to the direction of propagation of the detection light beam 29 that strikes the acousto-optical component. As a rule, the compensation element thus oriented is offset laterally with respect to the axis defined by the direction of propagation of the detection light beam that strikes the acousto-optical component, so that the detection light beam strikes the compensation element.

Figure 3:
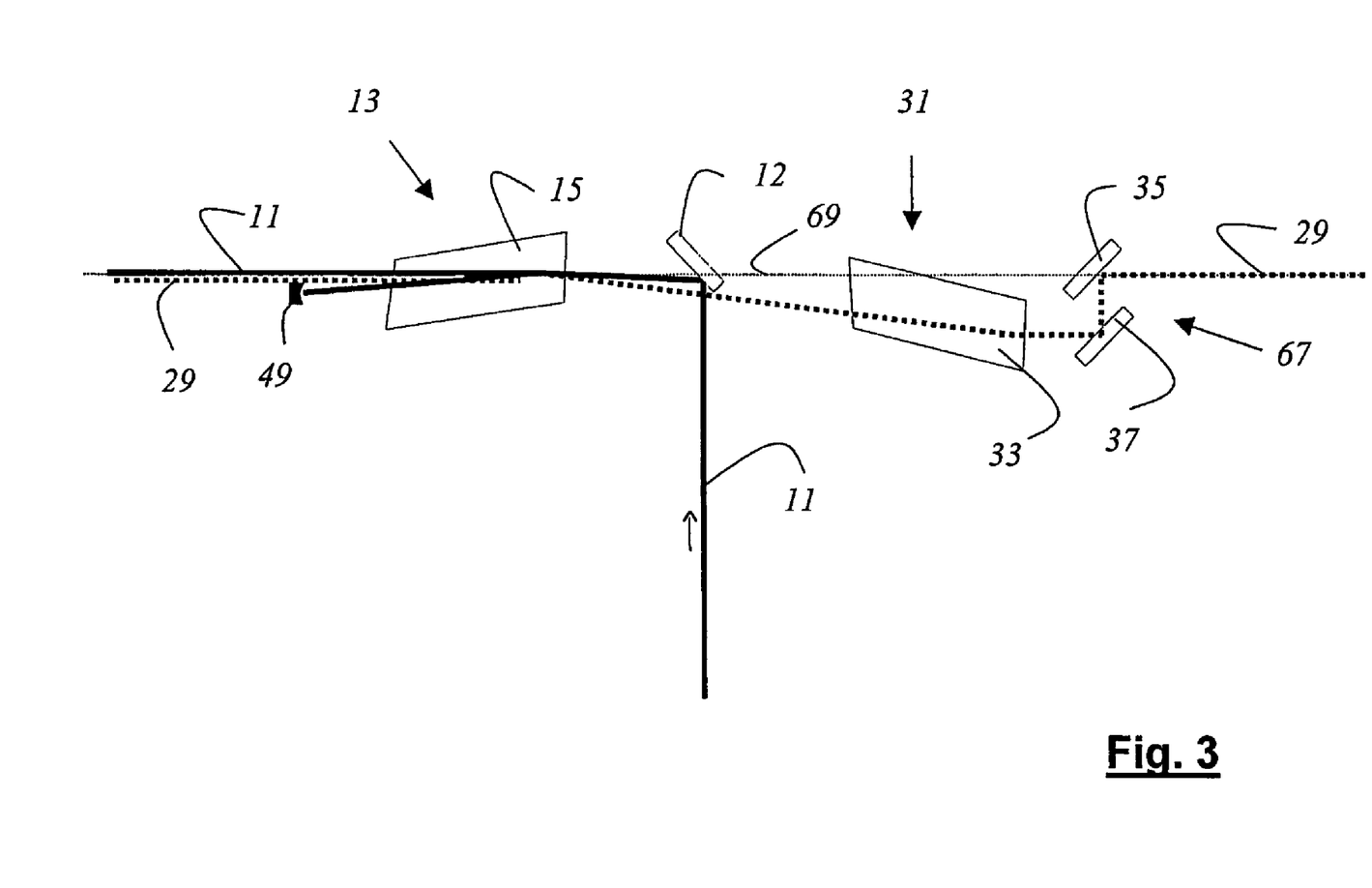
FIG. 3 another optical arrangement.

FIG. 3 shows another optical arrangement essentially corresponding to the arrangement described in FIG. 2. In addition, a pair of mirrors 67 is provided as a device to effectuate a displacement of the beam. After passing through the compensation element 31, the detection light beam 29 strikes the pair of mirrors 67 consisting of a first mirror 35 and a second mirror 37. The pair of mirrors serves to bring the detection light beam 29 to the desired axis 69.

Figure 4:
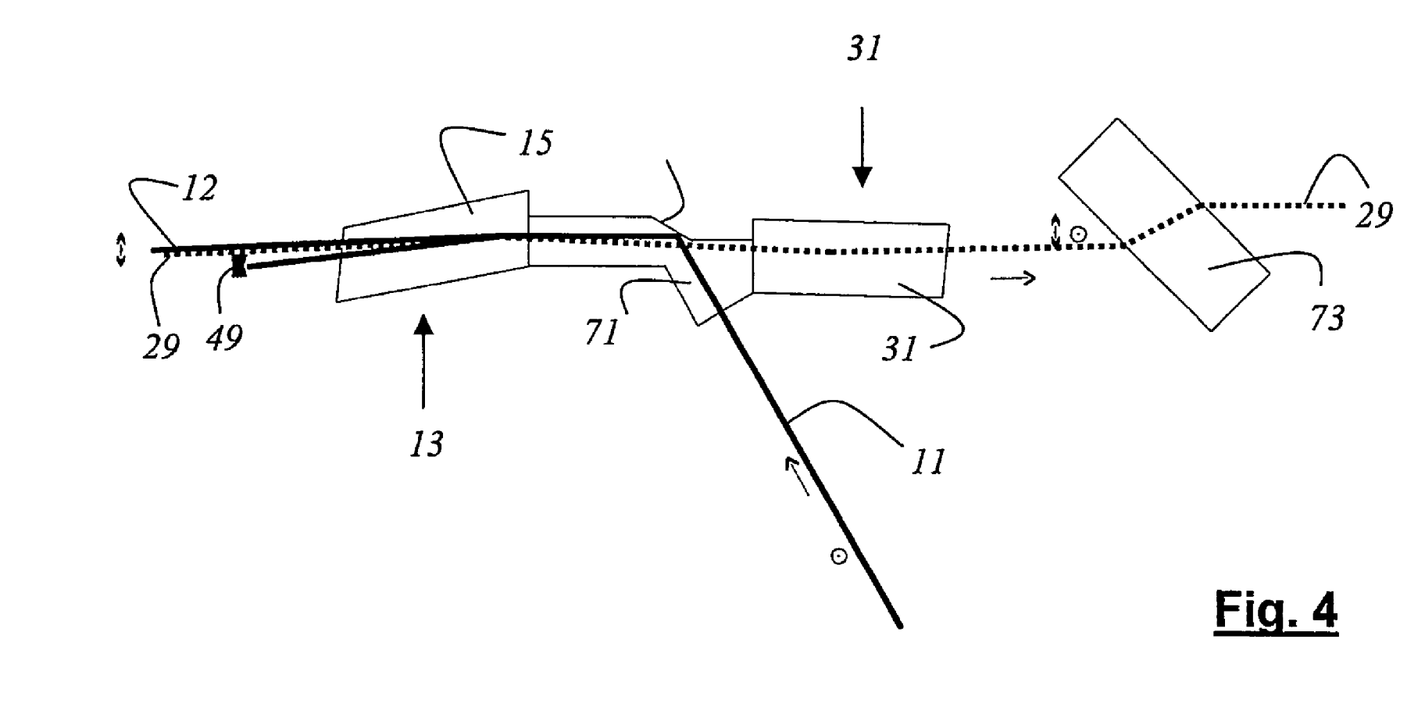
FIG. 4 another optical arrangement.

FIG. 4 shows another optical arrangement. With this arrangement, there is an intermediate element 71 that is cemented to the acousto-optical component 13 and to the compensation element 31. In this arrangement, no detrimental reflections occur on the boundary surfaces of the compensation element 31 and of the acousto-optical component 13 that face each other. The index of refraction of the intermediate element 71 and that of the cement are adapted to the indices of refraction of the compensation element 31 and of the acousto-optical component 13. A glass block 73 having the highest possible index of refraction is positioned downstream from the compensation element 31, as a device to effectuate a displacement of the beam; on the one hand, said glass block 73 refracts the detection light beam 29 to the desired axis and, on the other hand, it compensates for a spectral splitting caused by the acousto-optical component 13 or by the compensation element 31.

Figure 5:
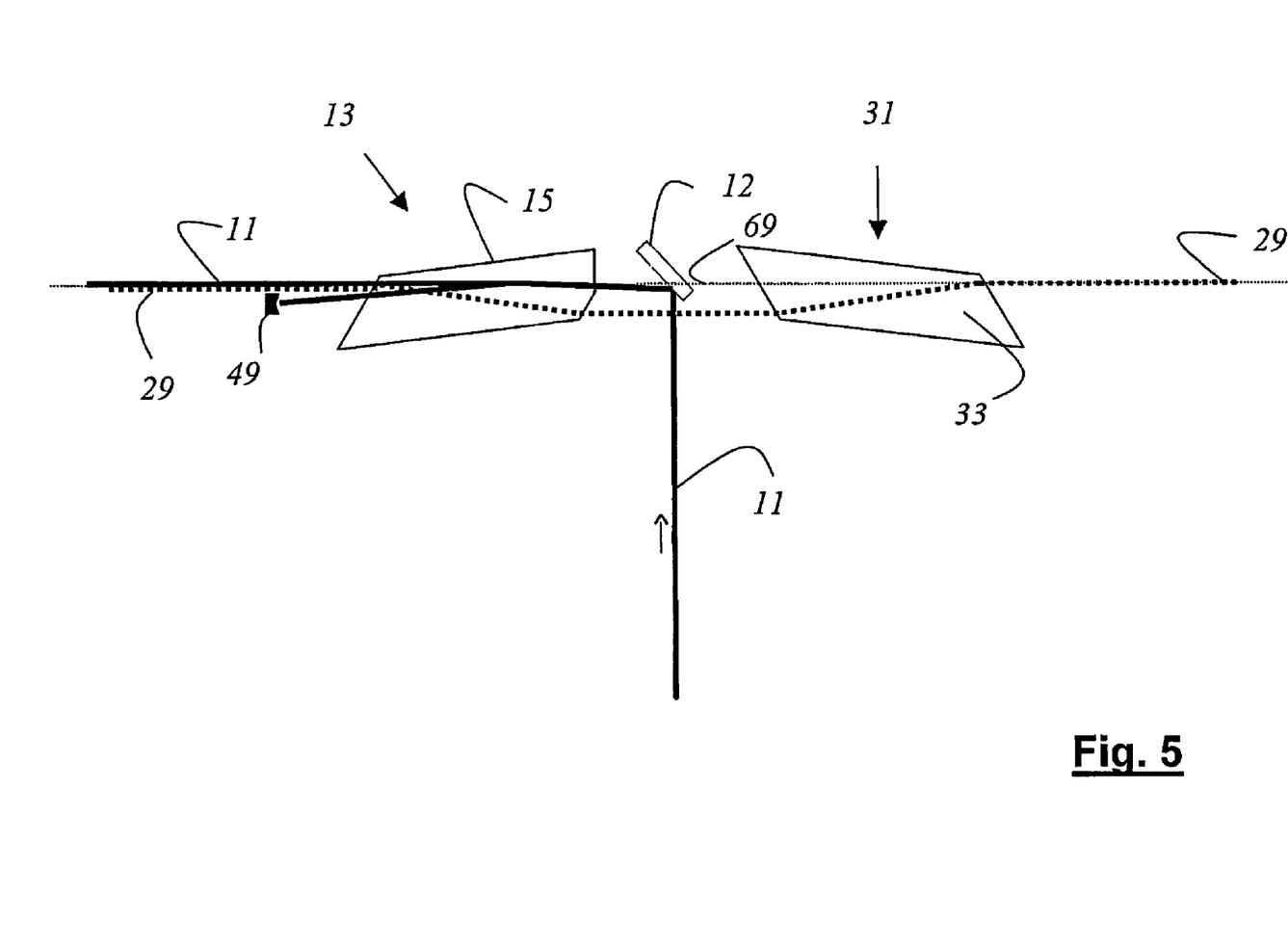
FIG. 5 another optical arrangement.

FIG. 5 shows another optical arrangement. The acousto-optical component in this arrangement is configured in such a way that the illumination light beam entering the acousto-optical component and the detection light beam exiting the component each have an entrance and exit window of their own. This optical arrangement entails the advantage that, even though the detection light beam undergoes a spectral spreading out, the spread-out detection light beam runs virtually parallel between the acousto-optical component and the compensation element, which improves the compensation by the compensation element.

The invention has been described with reference to a special embodiment. However, it goes without saying that changes and modifications can be undertaken without departing from the scope of protection of the claims presented below.

What is claimed is:

1. An optical arrangement for spatially separating an illumination light beam and a detection light beam, comprising:
   an acousto-optical component capable of splitting the detection light beam by birefringence;
   a compensation element configured to compensate, in a single passage of the detection light beam, for the splitting of the detection light beam; and
   an intermediate element disposed between the acousto-optical component and the compensation element, the intermediate element being configured to direct the illumination light beam to the acousto-optical component;
   wherein the compensation element and the acousto-optical component are oriented so as to be turned by 180° with respect to each other relative to a direction of propagation of the detection light beam striking the acousto-optical component.

2. The optical arrangement as recited in claim 1 wherein the acousto-optical component includes at least one of an acousto-optical tunable filter, an acousto-optical deflector, and an acousto-optical modulator.

3. The optical arrangement as recited in claim 1 wherein:
   the acousto-optical component is capable of splitting the detection light beam by dispersion; and
   the compensation element is configured to compensate for the splitting of the detection light beam due to dispersion.

4. The optical arrangement as recited in claim 1 wherein the compensation element and the acousto-optical component have a same exterior shape.

5. The optical arrangement as recited in claim 1 wherein the compensation element includes another acousto-optical component.

6. The optical arrangement as recited in claim 1 further comprising a beam-displacement device disposed downstream from the acousto-optical component and the compensation element.

7. The optical arrangement as recited in claim 1 wherein the acousto-optical component and the compensation element are cemented to each other.

8. The optical arrangement as recited in claim 1 wherein the intermediate element is cemented to the acousto-optical component and the compensation element.

9. A scanning microscope comprising:
   a light source configured to generate an illumination light beam;
   a detector configured to detect a detection light beam coming from a specimen;
   an acousto-optical component configured to spatially separate the illumination light beam and the detection light beam, the acousto-optical component being capable of splitting the detection light beam by birefringence;
   a compensation element configured to compensate, in a single passage of the detection light beam, for the splitting of the detection light beam; and
   an intermediate element disposed between the acousto-optical component and the compensation element, the intermediate element being configured to direct the illumination light beam to the acousto-optical component; wherein the compensation element and the acousto-optical component are oriented so as to be turned by 180° with respect to each other relative to a direction of propagation of the detection light beam.

10. The scanning microscope as recited in claim 9 wherein the acousto-optical component includes at least one of an acousto-optical tunable filter, an acousto-optical deflector, and an acousto-optical modulator.

11. The scanning microscope as recited in claim 9 wherein:
   the acousto-optical component is capable of splitting the detection light beam by dispersion; and
   the compensation element is configured to compensate for the splitting of the detection light beam due to dispersion.

12. The scanning microscope as recited in claim 9 wherein
   the compensation element and the acousto-optical component have a same exterior shape.

13. The scanning microscope as recited in claim 9 wherein the compensation element includes another acousto-optical component.

14. The scanning microscope as recited in claim 9 further comprising a beam-displacement device disposed downstream from the acousto-optical component and the compensation element.

15. The scanning microscope as recited in claim 9 wherein the acousto-optical component and the compensation element are cemented to each other.

16. The scanning microscope as recited in claim 9 wherein the intermediate element is cemented to the acousto-optical component and the compensation element.

17. The optical arrangement as recited in claim 1 wherein the intermediate element includes a reflecting mirror.

18. The scanning microscope as recited in claim 9 wherein the intermediate element includes a reflecting mirror.

19. The optical arrangement as recited in claim 1 wherein an index of refraction of the intermediate element is adapted to respective indices of refraction of the acousto-optical component and the compensation element.

20. The scanning microscope as recited in claim 9 wherein an index of refraction of the intermediate element is adapted to respective indices of refraction of the acousto-optical component and the compensation element.

* * * * *